United States Patent
Rezvani et al.

(10) Patent No.: US 10,810,890 B2
(45) Date of Patent: Oct. 20, 2020

(54) DYNAMIC DRONE NAVIGATION

(71) Applicant: Alarm.com Incorporated, Tysons, VA (US)

(72) Inventors: Babak Rezvani, Tysons, VA (US); Ahmad Seyfi, Tysons, VA (US)

(73) Assignee: Alarm.com Incorporated, Tysons, VA (US)

( * ) Notice: Subject to any disclaimer, the term of this patent is extended or adjusted under 35 U.S.C. 154(b) by 360 days.

(21) Appl. No.: 15/873,313

(22) Filed: Jan. 17, 2018

(65) Prior Publication Data

US 2018/0204470 A1 Jul. 19, 2018

Related U.S. Application Data

(60) Provisional application No. 62/447,256, filed on Jan. 17, 2017.

(51) Int. Cl.
*G08G 5/00* (2006.01)
*G01C 21/20* (2006.01)
(Continued)

(52) U.S. Cl.
CPC ......... *G08G 5/0069* (2013.01); *B64C 39/024* (2013.01); *G01C 21/206* (2013.01);
(Continued)

(58) Field of Classification Search
CPC .................................................... G08G 5/0069
See application file for complete search history.

(56) References Cited

U.S. PATENT DOCUMENTS 9,534,905 B1 * 1/2017 Bostick ............... G01C 21/206
9,866,313 B1 * 1/2018 Murphy ................ H04W 16/26
(Continued)

FOREIGN PATENT DOCUMENTS

CN 103812052 B 6/2016
JP 2014142742 8/2014
(Continued)

OTHER PUBLICATIONS

PCT International Preliminary Report on Patentability in International Application No. PCT/US2018/014048, dated Aug. 1, 2019, 9 pages.
(Continued)

*Primary Examiner* — Alex C Dunn
(74) *Attorney, Agent, or Firm* — Fish & Richardson P.C.

(57) ABSTRACT

Techniques are described for enabling a drone device to use a dynamic multi-dimensional spatial representation of an indoor property environment to improve autonomous navigation. In some implementations, an instruction to perform an action at a particular location of a property is received by a drone device. A spatial representation of the property that identifies a dynamic object is obtained by the drone device. The status of the dynamic object impacts an ability of the drone device to navigate near the dynamic object. Sensor data collected by one or more sensors of a monitoring system of the property and that indicates a present status of the dynamic object is obtained by the drone device. A path to the particular location is determined by the drone device. The path to the particular location is finally navigated by the drone device.

16 Claims, 5 Drawing Sheets

(51) Int. Cl.
*B64C 39/02* (2006.01)
*G05D 1/10* (2006.01)

(52) U.S. Cl.
CPC ........... *G05D 1/101* (2013.01); *G08G 5/0034* (2013.01); *B64C 2201/127* (2013.01); *B64C 2201/141* (2013.01)

(56) References Cited

U.S. PATENT DOCUMENTS

| | | | |
|---|---|---|---|
| 10,137,984 B1* | 11/2018 | Flick | B64D 47/00 |
| 10,558,226 B1* | 2/2020 | Bigdeli | G01C 21/206 |
| 2014/0316614 A1 | 10/2014 | Newman | |
| 2015/0268058 A1* | 9/2015 | Samarasekera | G06K 9/00637 701/409 |
| 2015/0298654 A1* | 10/2015 | Joao | G01S 19/16 701/2 |
| 2015/0339912 A1 | 11/2015 | Farrand et al. | |
| 2016/0070265 A1* | 3/2016 | Liu | G01C 21/00 701/3 |
| 2016/0107749 A1* | 4/2016 | Mucci | B64C 39/024 701/3 |
| 2016/0116914 A1* | 4/2016 | Mucci | G08B 13/19604 701/2 |
| 2016/0159463 A1* | 6/2016 | Wang | G05D 1/0016 701/2 |
| 2016/0217698 A1* | 7/2016 | Liu | G05D 1/101 |
| 2016/0225269 A1* | 8/2016 | Nikolajevic | B64C 27/04 |
| 2016/0327959 A1* | 11/2016 | Brown | G08G 5/0069 |
| 2017/0069214 A1 | 3/2017 | Dupray et al. | |
| 2017/0092109 A1 | 3/2017 | Trundle et al. | |
| 2017/0185849 A1 | 6/2017 | High et al. | |
| 2017/0203840 A1 | 7/2017 | Myslinski | |
| 2017/0205827 A1 | 7/2017 | Rezvani | |
| 2017/0225336 A1* | 8/2017 | Deyle | G06K 19/14 |
| 2017/0227965 A1* | 8/2017 | Decenzo | H04L 67/125 |
| 2017/0293301 A1 | 10/2017 | Myslinski | |
| 2017/0345282 A1 | 11/2017 | Farrell et al. | |
| 2018/0020333 A1* | 1/2018 | Gillen | G08G 1/005 |

FOREIGN PATENT DOCUMENTS

| | | |
|---|---|---|
| JP | 2017135550 A | 8/2017 |
| KR | 20170070713 A | 6/2017 |
| KR | 101827249 B1 | 2/2018 |
| WO | WO2016/145411 | 9/2016 |
| WO | WO2016/145447 | 9/2016 |
| WO | WO2016/180796 A2 | 11/2016 |
| WO | WO2016/180796 A3 | 11/2019 |

OTHER PUBLICATIONS

PCT Written Opinion of the International Searching Authority in International Application No. PCT/US18/14048, dated Apr. 5, 2018, 7 pages.
Extended European Search Report in European Application No. 18741695.3, dated Dec. 31, 2019, 8 pages.

* cited by examiner

200

```
┌─────────────────────────────────────────────────────────────┐
│ OBTAIN DATA INDICATING AN INSTRUCTION TO PERFORM A PARTICULAR│
│         ACTION ASSOCIATED WITH A PROPERTY                    │
│                                                         210  │
└─────────────────────────────────────────────────────────────┘
                              │
                              ▼
┌─────────────────────────────────────────────────────────────┐
│ OBTAIN DATA INDICATING A DYNAMIC MULTI-DIMENSIONAL SPATIAL   │
│            REPRESENTATION OF THE PROPERTY                    │
│                                                         220  │
└─────────────────────────────────────────────────────────────┘
                              │
                              ▼
┌─────────────────────────────────────────────────────────────┐
│   DETERMINE A CURRENT STATUS FOR ONE OR MORE DYNAMIC OBJECTS │
│                                                         230  │
└─────────────────────────────────────────────────────────────┘
                              │
                              ▼
┌─────────────────────────────────────────────────────────────┐
│  COMPUTE A NAVIGATIONAL ROUTE TO PERFORM THE PARTICULAR ACTION│
│                                                         240  │
└─────────────────────────────────────────────────────────────┘
                              │
                              ▼
┌─────────────────────────────────────────────────────────────┐
│  PERFORM THE PARTICULAR ACTION ACCORDING TO THE NAVIGATIONAL │
│                           ROUTE                              │
│                                                         250  │
└─────────────────────────────────────────────────────────────┘
```

FIG. 2

500
RECEIVE AN INSTRUCTION TO PERFORM AN ACTION AT A PARTICULAR LOCATION OF A PROPERTY
510
OBTAIN A SPATIAL REPRESENTATION OF THE PROPERTY THAT IDENTIFIES A DYNAMIC OBJECT
520
OBTAIN SENSOR DATA COLLECTED BY ONE OR MORE SENSORS OF A MONITORING SYSTEM OF THE PROPERTY
530
DETERMINE A PATH TO THE PARTICULAR LOCATION
540
NAVIGATE THE PATH TO THE PARTICULAR LOCATION
550
FIG. 5

DYNAMIC DRONE NAVIGATION

CROSS-REFERENCE TO RELATED APPLICATIONS

This application claims the benefit of U.S. Provisional Patent Application No. 62/447,256, filed on Jan. 17, 2017 and titled "DYNAMIC DRONE NAVIGATION," which is incorporated herein by reference in its entirety.

TECHNICAL FIELD

This disclosure relates to home monitoring technology.

BACKGROUND

An unmanned aerial vehicle (UAV), or a drone device, refers to an electronic device that is capable of navigating, either under remote control by a human operator, or fully or intermittently autonomously, by onboard computers. Drone devices can be associated with a monitoring system of a property to perform various types of monitoring operations of the property. For example, a camera of a drone device can capture video footage of a property premises while performing a surveillance operation.

SUMMARY

A drone device is often capable of using various indoor spatial tracking techniques to autonomously navigate through the premises of a property. For instance, the drone device may generate a spatial representation of a property premises based on data collected by on-board sensors. However, changes to an indoor environment often present various challenges to autonomous navigation. For example, changes to the configuration of doors and windows within a property can affect the paths that a drone device can use to navigate through the property premises. In some circumstances, when a user is remote from the property, the use of common spatial tracking techniques is often unable to capture sufficient information of an indoor environment of a property to allow the user to make informed decisions related to performing monitoring operations using the drone device.

Accordingly, techniques are described for enabling a drone device to generate and use a dynamic multi-dimensional spatial representation of an indoor property environment to improve autonomous navigation. The dynamic multi-dimensional spatial representation identifies respective locations of dynamic objects within a spatial map of the property, and a present status associated with each dynamic object. The drone device can periodically update the dynamic multi-dimensional spatial representation in order to capture changes to the status of the dynamic objects over time. For example, in some implementations, the drone device may generate a new dynamic multi-dimensional spatial representation prior to computing a navigational path for performing a specified action. In other implementations, the drone device may monitor the dynamic multi-dimensional spatial representation in real-time in order to detect status changes to dynamic objects that create obstructions on a selected navigational path of the drone device. In this regard, the drone device may utilize the techniques described throughout to improve path calculation as well as path adjustment in relation to performing a specified action.

In one general aspect, a computer-implemented method may include: obtaining, by a drone device, data indicating instructions to perform a particular action associated with a property; obtaining, by the drone device, data indicating a dynamic spatial map of the property that identifies locations of one or more dynamic objects within the property; determining, by the drone device, a present status for at least one of the one or more dynamic objects; computing, by the drone device, a route to perform the particular action based at least on the data indicating the dynamic multi-dimensional spatial map of the property and the present status determined for the at least one of the one or more dynamic objects; and performing, by the drone device, the particular action according to the route.

In another general aspect, a computer-implemented method can include the operations of: receiving, by a drone device, an instruction to perform an action at a particular location of a property; obtaining, by the drone device, a spatial representation of the property that identifies a dynamic object, where a status of the dynamic object impacts an ability of the drone device to navigate near the dynamic object; obtaining, by the drone device and based at least on identification of the dynamic object in the spatial representation of the property, sensor data collected by one or more sensors of a monitoring system of the property that indicates a present status of the dynamic object; determining, by the drone device, a path to the particular location based on the spatial representation of the property and the present status of the dynamic object; and navigating, by the drone device, the path to the particular location.

One or more implementations can include the following optional features. For example, in some implementations, determining the path to the particular location includes: determining, based on the sensor data, a change to the status of the dynamic object identified within the spatial representation of the property; generating a second spatial representation of the property that identifies the present status of the dynamic object, the present status reflecting the change to the status of the dynamic object identified within the spatial representation of the property. In such implementations, the path to the particular location is determined based on the second spatial representation of the property.

In some implementations, the spatial representation of the property is generated prior to receiving the instruction to perform the action at the particular location of the property.

In some implementations, the dynamic object is a door of the property. In such implementations, the status of the dynamic object identified in the spatial representation for the property indicates that the door is closed, and the present status of the dynamic object indicates that the door has been opened after receiving the instruction to perform the action at the particular location of the property. Additionally, navigating the path to the particular location includes navigating through the door to the particular location.

In some implementations, the present status of the dynamic object indicates that the door has been opened after receiving the instruction to perform the action at the particular location of the property. In such implementations, navigating the path to the particular location includes navigating through the door to the particular location.

In some implementations, the multiple candidate paths include a first candidate path that is associated with a first set of dynamic objects and a second candidate path that is associated with a second set of dynamic objects. In such implementations, selecting the candidate path from among the multiple candidate paths as the path to the particular location includes: identifying a first dynamic object that is included in the first set of objects but is not included in the second set of objects; determining that the present status of the first dynamic object indicates that the first dynamic object prevents the ability of the drone device to navigate near the dynamic object; and in response to determining that the present status of the first dynamic object indicates that the first dynamic object prevents the ability of the drone device to navigate near the dynamic object, selecting the second candidate path as the path to the particular location.

In some implementations, the method further includes the operations of: collecting, by the drone device, spatial data of a physical environment of the property during an initial registration of the property; and generating the spatial representation based on the spatial data of the physical environment of the property collected during the initial registration of the property.

In some implementations, the spatial representation of the property is generated in response to receiving a prior instruction to perform an action at the particular location.

In some implementations, the method further includes the operations of: determining, by the drone device, a present location of the drone device within the property based on the spatial representation. In such implementations, the path to the particular location is determined based on the present location of the drone device within the property.

In some implementations, obtaining the sensor data collected by one or more sensors of the monitoring system of the property includes: obtaining, from the monitoring system, association data that identifies sensors of the monitoring system as corresponding to physical objects located within the property; and determining that the one or more sensors from among the sensors of the monitoring system corresponds to a physical object that is represented by the dynamic object within the spatial representation of the property.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DESCRIPTION OF DRAWINGS

FIG. 2 illustrates an example of a process for performing a particular action according to a path identified using a dynamic multi-dimensional spatial representation of a property.

FIG. 5 illustrates an example of a process for determining a navigation path within a property based on a spatial representation of the property and a present status of a dynamic object within the property.

In the drawings, like reference numbers represent corresponding parts throughout.

DETAILED DESCRIPTION

Figure 1:
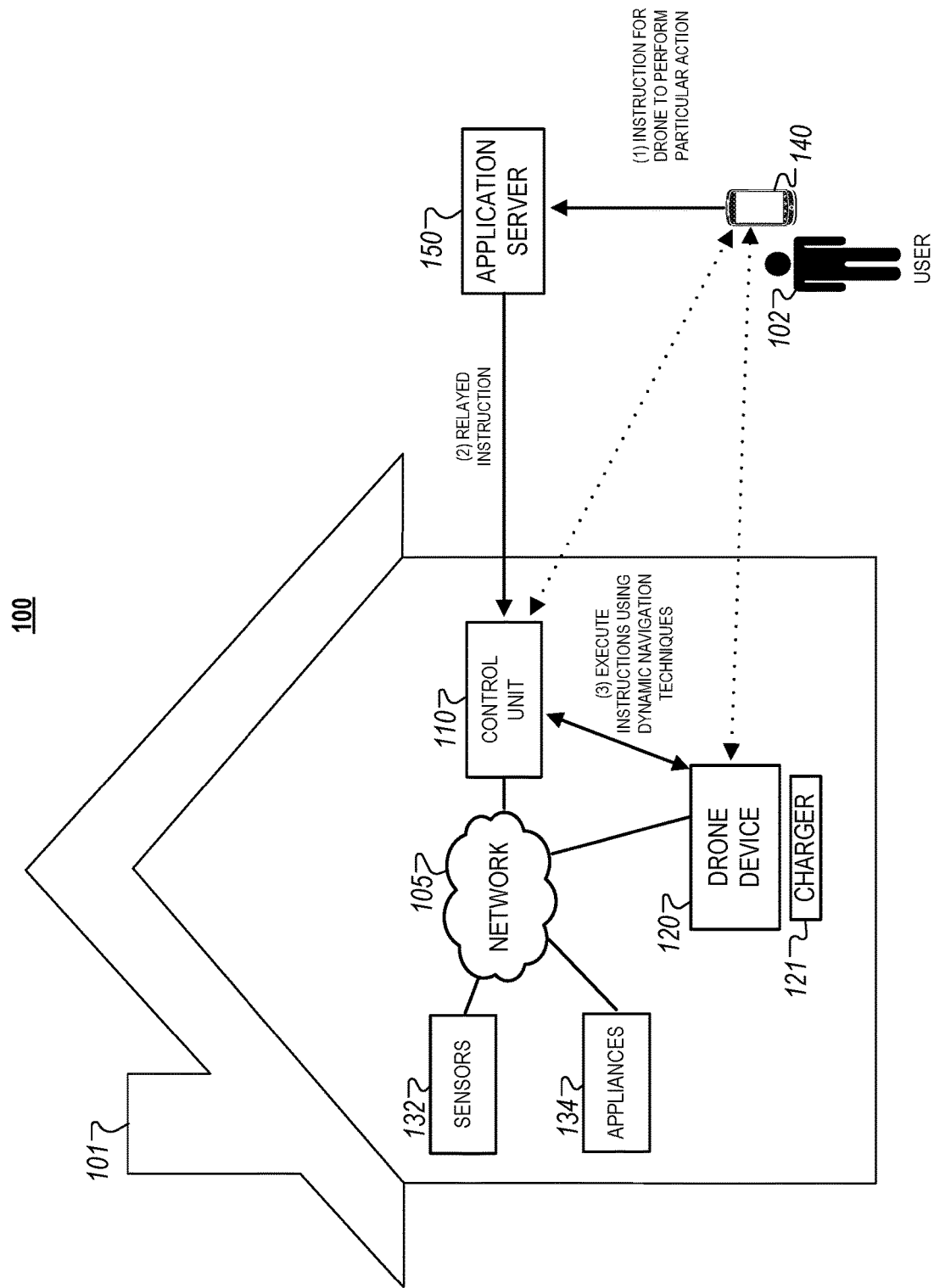
FIG. 1 illustrates an example of a system that is capable of utilizing dynamic drone navigation techniques.

In general, techniques are described for enabling a drone device to use a dynamic multi-dimensional spatial representation of an indoor property environment to improve autonomous navigation. The dynamic multi-dimensional spatial representation identifies respective locations of dynamic objects within a spatial map of the property, and a present a status associated with each dynamic object. The drone device can periodically update the dynamic multi-dimensional spatial representation in order to capture changes to the status of the dynamic objects over time.

For example, in some implementations, the drone device may generate a new dynamic multi-dimensional spatial representation prior to computing a navigational path for performing a specified action. In other implementations, the drone device may monitor the dynamic multi-dimensional spatial representation in real-time in order to improve status changes to dynamic objects that create obstructions on a selected navigational path of the drone device. In this regard, the drone device may utilize the techniques described throughout to improve path calculation as well as path adjustment in relation to performing a specified action.

As described throughout, a "dynamic object" refers to any type of physical object whose placement, configuration, location, or structure can be adjusted over time. In some examples, a dynamic object can represent structural elements associated with a property premises such as a door, window, or sliding wall. In other examples, a dynamic object can represent stationary objects such as furniture whose placement within an indoor environment can be adjusted. In other examples, a dynamic object can represent movable tangible objects.

As described throughout, a "status" of a dynamic object refers to a present placement, configuration, location, or structure of the dynamic object at any given instance in time. For example, a status of a window can represent whether the window is open or closed, or the degree to which the window is open. In another example, the status of a door can represent whether the door is open or closed, or the degree to which the door is open represented by the angle formed between the edge of the door and the door frame. In yet another example, the status of an appliance such as a ceiling fan can represent if the fan is on or off.

As described in greater detail below, the status of a dynamic object can be used to determine whether the present configuration, location, or structure of the dynamic object presents an impediment to a navigational path of a drone device. For example, if a bedroom door is presently closed, then its corresponding present status can be used to indicate that the drone device will be unable to access the bedroom through the bedroom door. In another example, if a ceiling fan is currently turned on, then its corresponding present status can be used to indicate that the surrounding region is an obstruction to the drone device.

In some implementations, present status information can be used to provide granular information related to the ability of the drone device to navigate through the indoor environment of a property. For instance, status information indicating a degree to which a window or door is presently open can be used to determine if a drone device can navigate through a space associated with the opening. In one example, if the status indicates that a window is 60% open, then the spacing may be large enough to enable a drone device to pass through the space. Alternatively, if the status indicates that the window is 30% open, then the status may instead be used to determine that the drone device cannot pass through the opening even through sensor information indicates that the window is "open."

As described throughout, a "user" refers to an individual that has sufficient authority to access a property and transmit instructions to configure and/or adjust monitoring operations associated with the property. In some examples, the user presently occupies a property when the drone device performs the dynamic navigation techniques described throughout. In such examples, the user may transmit instructions to the drone device directly (e.g., through a voice query) or over a local network within the property. In other examples, the user is remote from the property when the drone device performs the dynamic navigation techniques. In such examples, the user may use a webpage and/or a mobile application to transmit instructions to the drone device through an associated application server that is configured to monitor communications with devices of a monitoring system over a wide area network.

FIG. 1 illustrates an example of a system 100 that is capable of utilizing dynamic drone navigation techniques. The system 100 includes a monitor control unit 110, a drone device 120, sensors 132, appliances 134, a user device 140, and an application server 150 connected over a network 105 within a property 101. The user device 140 can be associated with a user 102 such as an individual that is authorized to access the property 101 and/or control monitoring operations of the system 100.

In general, the system 100 enables the user 102 to configure and adjust various types of monitoring operations that are associated with the property 101. As examples, the user 102 can use the system 100 to view and collect security footage captured by the sensors 132, tracking detected movement throughout the property premises, adjust a set point temperature for a connected thermostat, enable or disable the operation of the appliances 134, or transmit instructions to the drone 120 to perform a specified action.

When the user 102 is remote from the property 101, as depicted in FIG. 1, the user 102 may use a mobile application on the user device 140 to remotely transmit instructions to perform specified actions. The instructions are transmitted to the application server 150, and then relayed to local devices such as the drone device 120 through the monitor control unit 110. In some implementations, the drone device 120 may also be capable of directly exchanging communications with the application server 150. Although the system 100 can be used to perform general purpose monitoring operations, as described above, the descriptions herein are directed to the use of instructions to control and adjust the operation of the drone device 120 for brevity.

Referring now to the components of system 100, the network 105 is configured to enable exchange of electronic communications between devices connected to the network 105. For example, the network 105 may be configured to enable exchange of electronic communications between the monitor control unit 110, the drone device 120, the sensors 132, the appliances 134, the user device 140, and the application server 150.

The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitor control unit 110 includes a controller and a network module. The controller is configured to control a monitoring system (e.g., a home alarm or security system) that includes the drone device 120. In some examples, the controller may include a processor or other control circuitry configured to execute instructions of a program that controls operation of an alarm system. In these examples, the controller may be configured to receive input from sensors, detectors, or other devices included in the alarm system and control operations of devices included in the alarm system or other household devices (e.g., a thermostat, an appliance, lights, etc.). For example, the controller may be configured to control operation of the network module included in the drone device 120.

The network module is a communication device configured to exchange communications over the network 105. The network module may be a wireless communication module configured to exchange wireless communications over the network 105. For example, the network module may be a wireless communication device configured to exchange communications over a wireless data channel and a wireless voice channel. In this example, the network module may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module also may be a wired communication module configured to exchange communications over the network 105 using a wired connection. For instance, the network module may be a modem, a network interface card, or another type of network interface device. The network module may be an Ethernet network card configured to enable the drone device 120 to communicate over a local area network and/or the Internet. The network module also may be a voice band modem configured to enable the alarm panel to communicate over the telephone lines of Plain Old Telephone Systems (POTS).

The monitor control unit 110 may store sensor and image data received from the system 100 and perform analysis of sensor and image data received from the system 100. Based on the analysis, the monitor control unit 110 may communicate with, and control aspects of, the drone device 120, the sensors 132, the appliances 134, or the user device 140. In addition, the monitor control unit 110 may store dynamic object data (e.g., based on sensor data collected by the sensors 132), or information associated with dynamic object data (e.g., historical status information associated with dynamic objects). The monitor control unit 110 may also store data associated with the dynamic multi-dimensional spatial representations that are determined for the property 101. For example, the monitor control unit 110 may store historical data associated with previously generated spatial representations of the property 101 over a specified period of time.

The drone device 120 may be an unmanned device that is capable of movement through a property to assist a user that is presently located within property during a detected emergency condition. For example, the drone device 120 may be capable of moving throughout a property based on automated control technology and/or input control provided either by the user or by the application server 150. In such an example, the drone device 120 may be able to fly, roll, walk, or otherwise move about the property.

The drone device 120 may include helicopter type devices (e.g., quad copters), rolling helicopter type devices (e.g., roller copter devices that can fly and also roll along the grounds, walls, or ceiling), land vehicle type devices (e.g., automated cars that drive around a property), and plane type devices (e.g., unmanned aircraft). In some instances, the drone device 120 may be robotic devices that are intended for other purposes and merely associated with the system 100 for use in appropriate circumstances. For instance, a security drone may be associated with the system 100 as the drone device 120 and may be controlled to take action responsive to system events.

The drone device 120 can be configured to automatically navigate within a property. For instance, the drone device 120 may include sensors and control processors that guide movement of the drone device 120 within the property. The drone device 120 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The drone device 120 may include control processors that process output from the various sensors and control the drone device 120 to move along a navigational path that reaches the desired destination and avoids obstacles. In this regard, the control processors detect walls or other obstacles in the property and guide movement of the drone device 120 in a manner that avoids the walls and other obstacles.

In addition, the drone device 120 may store data that describes attributes of the property. For instance, the drone device 120 may store a floorplan and/or a three-dimensional model of the property that enables the drone device 120 to navigate the property. During initial configuration, the drone device 120 may receive the data describing attributes of a property, determine a frame of reference to the data (e.g., a home or reference location in the property), and navigate a property based on the frame of reference and the data describing attributes of a property.

Further, initial configuration of the drone device 120 also may include learning of one or more navigation patterns in which a user or a system administrator provides input to control the drone device 120 to perform a specific navigation action (e.g., fly to an upstairs bedroom and spin around while capturing video and then return to a home charging base). In this regard, the drone device 120 may learn and store the navigation patterns such that the drone device 120 may automatically repeat the specific navigation actions when instructed to assist a user during a detected emergency condition at the property.

In some implementations, the drone device 120 may include data capture and recording devices. In these examples, the drone device 120 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property.

In some implementations, the drone device 120 may include output devices. In these implementations, the drone device 120 may include one or more displays, one or more speakers, one or more projectors, and/or any type of output devices that allow the drone device 120 to communicate information to a nearby user. The one or more projectors may include projectors that project a two-dimensional image onto a surface (e.g., wall, floor, or ceiling) and/or holographic projectors that project three-dimensional holograms into a nearby space.

The drone device 120 also may include a communication module that enables the drone device 120 to communicate other devices of the system 100. The communication module may be a wireless communication module that allows the drone device 120 to communicate wirelessly. For instance, the communication module may be a Wi-Fi module that enables the drone device 120 to communicate over a local wireless network at the property. The communication module further may be a 900 MHz wireless communication module that enables the drone device 120 to communicate directly with the monitor control unit 110. Other types of short-range wireless communication protocols, such as Bluetooth, Bluetooth LE, Z-wave, ZigBee, etc., may be used to allow the drone device 120 to communicate with other devices in the property.

The drone device 120 further may include processor and storage capabilities. The drone device 120 may include any suitable processing devices that enable the drone device 120 to operate applications and perform the actions described throughout this disclosure. In addition, the drone device 120 may include solid state electronic storage that enables the drone device 120 to store applications, configuration data, collected sensor data, and/or any other type of information available to the drone device 120.

The drone device 120 may be associated with a charging station 121. The charging station 121 may be located at a predefined or reference location within a property. The drone device 120 may be configured to navigate to the charging station 121 after successfully performing a particular specified action. For instance, after completing the specified action upon instruction by the monitor control unit 110, the drone device 120 may be configured to automatically fly to and land on one of the charging station 121. In this regard, the drone device 120 may automatically maintain a fully charged battery in a state in which the drone device 120 are ready for use by the system 100.

The charging station 121 may be a contact-based charging stations and/or wireless charging stations. For contact based charging stations, the drone device 120 may have readily accessible points of contact that the drone device 120 are capable of positioning and mating with a corresponding contact on the charging station 121. For instance, a helicopter type robotic device may have an electronic contact on a portion of its landing gear that rests on and mates with an electronic pad of a charging station 121 when the helicopter type robotic device lands on the charging station 121. The electronic contact on the robotic device may include a cover that opens to expose the electronic contact when the robotic device is charging and closes to cover and insulate the electronic contact when the robotic device is in operation.

For wireless charging stations, the drone device 120 may charge through a wireless exchange of power. In these cases, the drone device 120 need only locate themselves closely enough to the wireless charging stations for the wireless exchange of power to occur. In this regard, the positioning needed to land at a predefined home base or reference location in the property may be less precise than with a contact-based charging station. Based on the drone device 120 landing at a wireless charging station, the wireless charging station outputs a wireless signal that the drone device 120 receive and convert to a power signal that charges a battery maintained on the drone device 120.

As described above, the drone device 120 may exchange communications with the monitor control unit 110, the sensors 132, the appliances 134, the user device 140, and the application server 150 over the network 105 or any other suitable communication means. For example, the drone device 120 may utilize a wireless data pathway configured to transmit signals from the monitor control unit 110, the sensors 132, the appliances 134, the user device 140, and the application server 150 to a controller. The monitor control unit 110, the sensors 132, the appliances 134, the user device 140, and the application server 150 may continuously transmit sensed values to the controller, periodically transmit sensed values to the drone device 120, or transmit sensed values to the drone device 120 in response to a change in a sensed value.

In some implementations, the drone device 120 may additionally be used to perform routine surveillance operations on a property. For instance, the drone device 120 may be assigned to one or more particular properties within a geographic location and may routinely collect surveillance footage during specified time periods (e.g., after dark), which may then be transmitted to the application server 150 for transmitting back to each particular property owner. In such implementations, the property owner may receive the surveillance footage over the network 105 as a part of a service provided by a security provider that operates the application server 150. For example, transmissions of the surveillance footage collected by the drone device 120 may be part of a premium security service package provided by a security provider in addition to the routine drone emergency response service.

In some implementations, the drone device 120 may monitor the operation of the monitor control unit 110, the sensors 132, the appliances 134, the user device 140, and/or the application server 150. For instance, the drone device 120 may enable or disable the devices located within a property based on a set of rules associated with energy consumption, user-specified settings, and/or other information associated with conditions prior to, during, or after performing a particular action.

In some implementations, the drone device 120 may be used as a replacement to a traditional security panel (e.g., the monitor control unit 110) that is used to monitor and control the operations of the system 100. In other examples, the drone device 120 may coordinate monitoring operations with a separate security panel of the system 100. In such examples, the drone device 120 may monitor particular activities of the devices of the system 100 that are not monitored by the security panel, or monitor the operation of particular devices that are not monitoring by the security panel.

In some implementations, the drone device 120 is configured and managed by a service provider entity associated with the application server 150. In such implementations, the drone device 120 may be provided as device component of the system 100 when the sensors 132 and/or the monitor control unit 110 is installed within a property. Alternatively, in other implementations, the drone device 120 may be an after-market device that is configured to exchange data communications with components of the system 100 (e.g., the monitor control unit 110, the sensors 132, and/or the appliances 134) when the system 100 is already installed within the property. In this regard, the drone device 120 may be a device from the system 100 this is configured to perform the operations described throughout.

In some implementations, the system 100 may include multiple drone devices that exchange communications with one another to perform the monitoring operations described throughout. For example, a particular drone device may be designated to monitor a specified region of the property 101. Each drone device may then transmit collected data for each designated region to, for example, the monitor control unit 110 and/or the application server 150, which then aggregates the collected data from each drone device. In such implementations, the multiple drone devices may operate as a distributed drone network to monitor region-specific property information.

The system 100 also includes one or more sensors or detectors. For example, the system 100 may include multiple sensors 132. The sensors 132 may include a contact sensor, a motion sensor, a glass break sensor, or any other type of sensor included in an alarm system or security system. The sensors 132 also may include an environmental sensor, such as a temperature sensor, a water sensor, a rain sensor, a wind sensor, a light sensor, a smoke detector, a carbon monoxide detector, an air quality sensor, etc. The sensors 132 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 132 may include a radio-frequency identification (RFID) sensor that identifies a particular article that includes a pre-assigned RFID tag.

In some implementations, the sensors 132 may include one or more cameras. The cameras may be video/photographic cameras or other type of optical sensing devices configured to capture images. For instance, the cameras may be configured to capture images of an area within a building monitored by the monitor control unit 110. The cameras may be configured to capture single, static images of the area and also video images of the area in which multiple images of the area are captured at a relatively high frequency (e.g., thirty images per second). The cameras may be controlled based on commands received from the monitor control unit 110.

The appliances 134 may be home automation devices connected to the network 105 that are configured to exchange electronic communications with other devices of the system 100. The appliances 134 may include, for example, connected kitchen appliances, controllable light sources, safety and security devices, energy management devices, and/or other types of electronic devices capable of exchanging electronic communications over the network 105. In some instances, the appliances 134 may periodically transmit information and/or generated data to the monitor control unit 110 such that the monitor control unit 110 can automatically control the operation of the appliances 134 based on the exchanged communications. For example, the monitor control unit 110 may operate one or more of the appliances 134 based on a fixed schedule specified by the user. In another example, the monitor control unit 110 may enable or disable one or more of the appliances 134 based on received sensor data from the sensors 132.

The user device 140 may be any type of personal electronic computing device that is associated with users that reside within the property 101 (e.g., a tenant, temporary visitor, guest, etc.). The user device 140 may be one or more of a cellular telephone, smartphone, a tablet-computing device, a laptop computing device, a desktop computing device, a wearable device, or any other type of network-enabled electronic device.

The user device 140 may include a native application that enables communications with devices located within the property 101 through the application server 150. The native application refers to software/firmware programs running on the user device 140 that enable various features. For instance, the user device 140 may load or install the native application based on data received over a network 105 or data received from local media. The native application may run on various mobile device platforms associated with the user device 140.

In some implementations, the native application of the user device 140 identifies a geographic location associated with the user device 140 and communicates information identifying the geographic location. For example, the user device 140 having the native application may determine a geographic location of the user device 140 using GPS capabilities, and may communicate data identifying the geographic location to the application server 150. In some instances, the native application may check the location of the user device 140 periodically and may detect when a user is presently located inside or outside a property. The drone device 120 to determine the region of the property where the user is located within the property can then use location data associated with the user device 140.

Additionally, or alternatively, the user device 140 may communicate with the monitor control unit 110 and/or the drone device 120 using various local wireless protocols, such as Wi-Fi, Bluetooth, Z-Wave, ZigBee, Home Plug, HPAV, HPAV2, G.hn (Ethernet over power line), or wired protocols such as Ethernet, USB, and other wired protocols based on the RS232, RS485, and/or RS422 standards.

The application server 150 may be an electronic device configured to provide monitoring services by exchanging electronic communications with the monitor control unit 110, the drone device 120, the sensors 132, the appliances 134, and the user device 140 over the network 105.

The application server 150 may be configured to monitor events (e.g., alarm events, emergency conditions, etc.) generated by the monitor control unit 110 and/or the drone device 120. For example, the application server 150 may exchange electronic communications with the network module included in the monitor control unit 110 to receive information regarding events (e.g., fire, carbon monoxide) detected by the monitor control unit 110. The application server 150 also may receive information regarding events (e.g., alarm events) from the drone device 120.

The application server 150 may store sensor and image data received from the system 100 and perform analysis of sensor and image data received from the system 100. Based on the analysis, the application server 150 may communicate with and control aspects of the monitor control unit 110, the drone device 120, or the user device 140. In addition, the application server 150 may store dynamic object data (e.g., based on sensor data collected by the sensors 132), or information associated with dynamic object data (e.g., historical status information associated with dynamic objects). The application server 150 may also store data associated with the dynamic multi-dimensional spatial representations that are determined for the property 101. For example, the application server 150 may store historical data associated with previously generated spatial representations of the property 101 over a specified period of time.

In some implementations, the system 100 may use the dynamic navigation techniques described throughout in order to perform surveillance operations related to dynamic objects. In such implementations, a dynamic object can also represent any type of movable asset that is capable of being monitored by the drone device 120. For example, the dynamic object can be a painting that is affixed to a wall within the property 101. In this example, the status of the dynamic object can be used to ensure that the dynamic object has not been removed from the property 101 and/or remains in a location that has been authorized by the user 102. For instance, the status of the dynamic object can be periodically monitored using the techniques described throughout, and in response to either determining that the dynamic object cannot be located and/or is located in an unauthorized region of the property 101, the system 100 may transmit alert notifications to the monitor control unit 110, the user device 140, and/or the application server 150.

FIG. 2 illustrates an example of a process 200 for performing a particular action according to a path identified using a dynamic multi-dimensional spatial representation of a property. The process 200 can include obtaining data indicating instructions to perform a particular action associated with a property (210), obtaining data indicating a dynamic multi-dimensional spatial representation of the property (220), determining a present status for one or more dynamic objects (230), computing a navigational path to perform the particular action (240), and performing the particular action according to the navigational path (250).

In more detail, the process 200 can include obtaining data indicating instructions to perform a particular action associated with a property (210). For instance, the drone device 120 may obtain an instruction to perform a particular action associated with the property 101 as depicted in FIG. 1. The user 102 using the user device 140 can transmit the instruction. In some instances, when the user 102 is located within the property 101, the instructions can be in the form of a voice query and/or gesture directed towards the drone device 120. In other instances, when the user 102 is remote from the property 101, the instructions may instead be transmitted through the application server 150 and/or the monitor control unit 110.

The instructions may identify, for example, an object of interest within the property 101 and an action to be performed by the drone device 120 in relation to the object of interest. For instance, an instruction may specify that the drone device 120 check the status and/or condition of the object of interest (e.g., a painting on a wall) while the user 102 is away from the property. In such examples, the instructions can be used to remotely instruct the drone device 120 to perform a surveillance operation. In other examples, the instructions may be transmitted automatically by the system 100 to perform a routine operation that is periodically performed by the drone device 120 (e.g., generating a dynamic multi-dimensional spatial representation of an indoor environment of the property 101).

Figure 3:
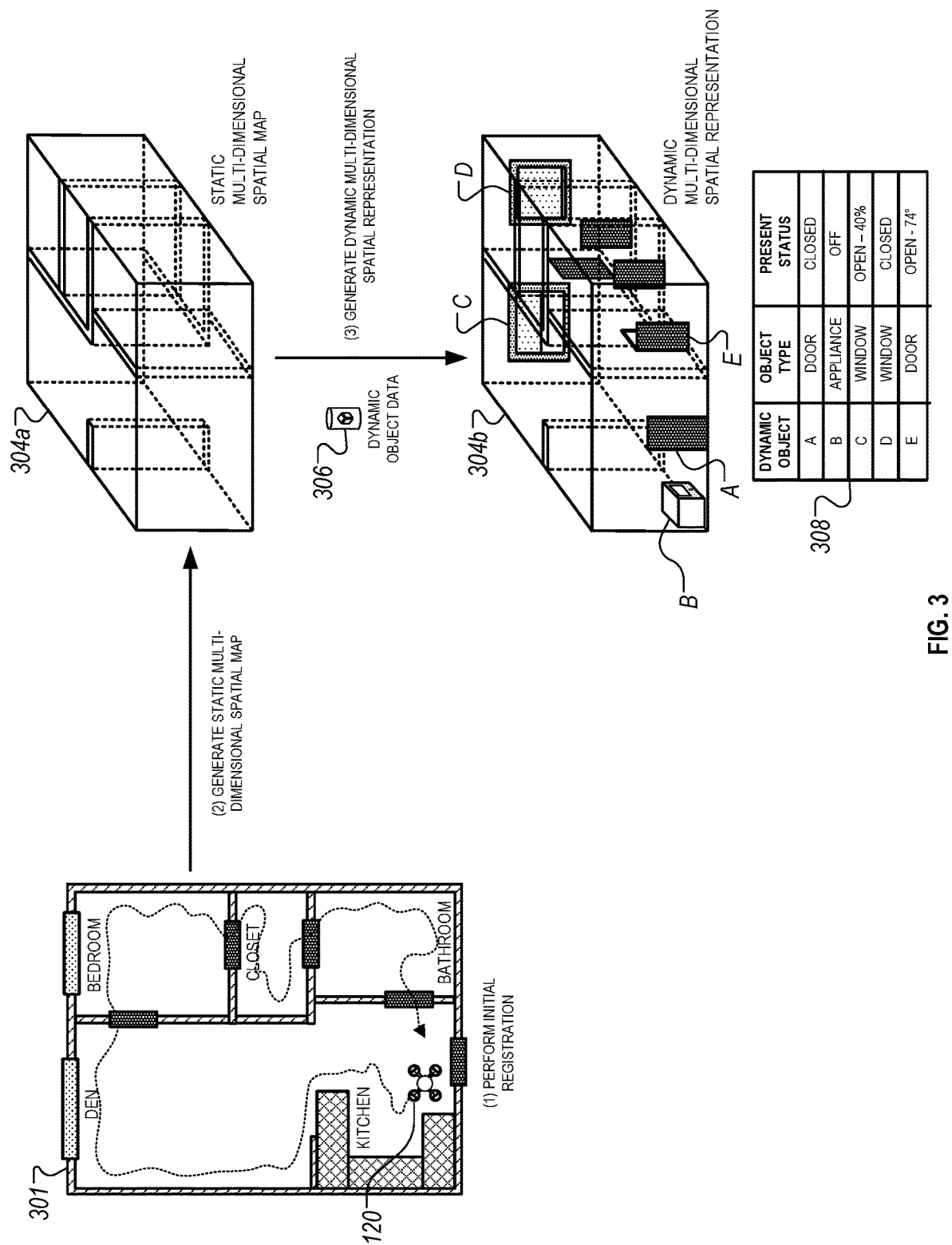
FIG. 3 illustrates an example of a technique for generating a dynamic multi-dimensional spatial representation of a property.

The process 200 can include obtaining data indicating a dynamic multi-dimensional spatial representation of the property (220). For instance, the drone device 120 may obtain data indicating a dynamic multi-dimensional spatial representation of the property 101 as illustrated in FIG. 3. In some implementations, the dynamic multi-dimensional spatial representation of the property 101 may be generated prior to receiving the instruction in step 210. In other implementations, the dynamic multi-dimensional spatial representation may instead be generated in real-time as the drone device 120 processes the received instruction.

The dynamic multi-dimensional spatial representation identifies one or more dynamic objects that are located within an indoor environment of the property 101, and a present status for each of the one or more dynamic objects. As described above, the present status can indicate, for example, the configuration, placement, location, and/or operation of a dynamic object and how this information can potentially impact navigation of the drone device 120 through the indoor environment of the property 101.

The process 200 can include determining a present status for one or more dynamic objects (230). For instance, the drone device 120 may determine a present status for the one or more dynamic objects that are identified within the dynamic multi-dimensional spatial representation of the property 101. As illustrated in FIG. 3, the dynamic multi-dimensional spatial representation identifies the locations of the dynamic objects within three-dimensional map of the property and includes associated information relating to the configuration, placement, and/or position of each dynamic object that is identified within the dynamic multi-dimensional spatial representation of the property 101. For example, for a door that is detected to be open, the present status can indicate a degree to which the door is open and the minimum degree that allows for the drone device 120 to pass through its opening.

Figure 4:
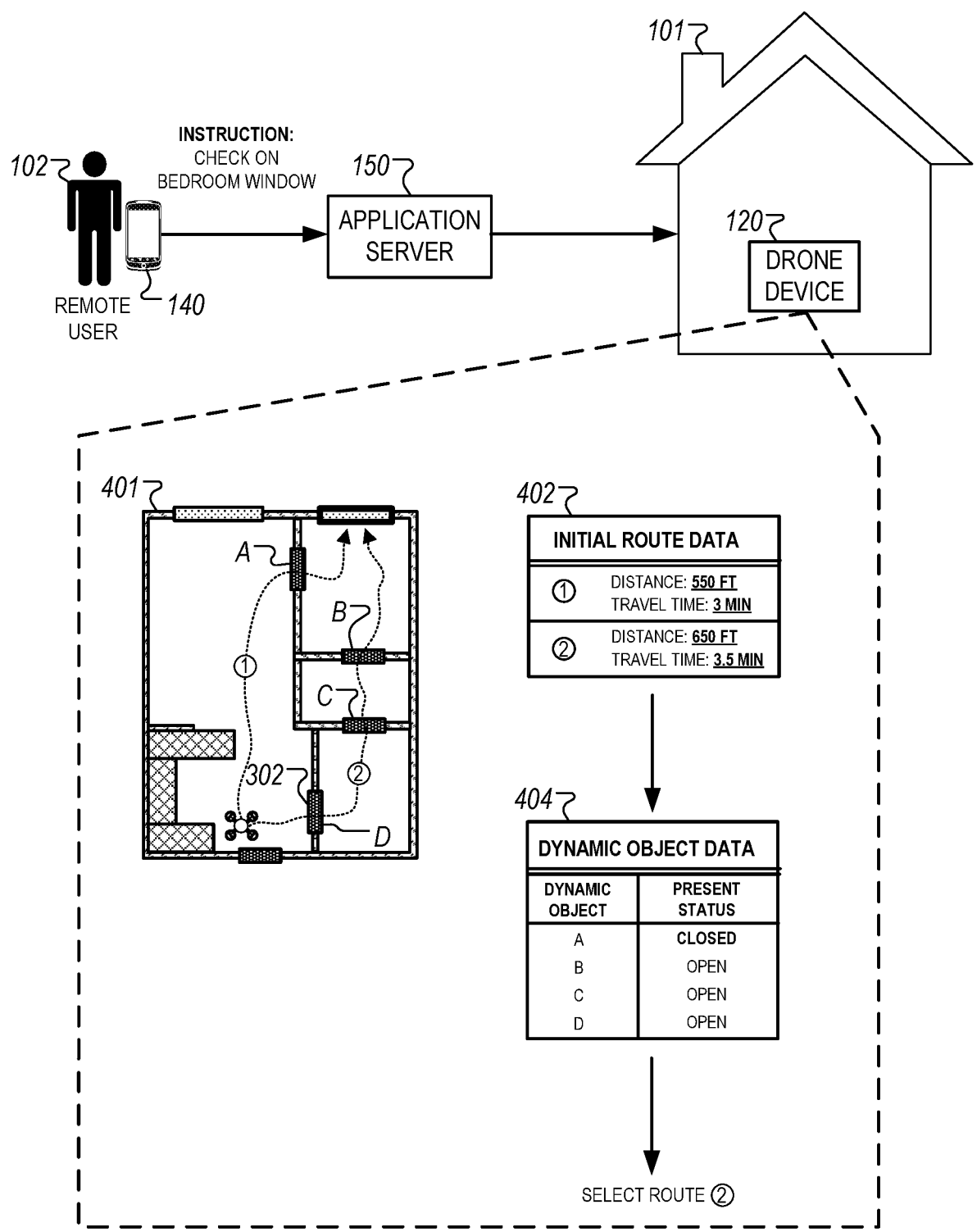
FIG. 4 illustrates and example of a technique for computing a navigational path for performing a particular action.

The process 200 can include computing a navigational path to perform the particular action (240). For instance, the drone device 120 may compute a navigational path to perform the particular action based on the present status of the dynamic objects that are identified by the dynamic multi-dimensional spatial representation of the property 101. For example, as illustrated in FIG. 4, the drone device 120 may determine a destination location associated with the particular action, and determine alternative navigational paths to reach the destination location from its current location. The drone device 120 may then identify dynamic objects that are within a certain proximity to each alternative path. The drone device 120 may then use the status information for each nearby dynamic object to determine an impact on its ability to travel along the navigation path. For example, if a present status of a door indicates that it is closed, then the an alternative navigational path that requires the drone device 120 to pass through the door may be determined to be obstructed based on the inability of the drone device 120 to pass through the closed door.

In some implementations, the drone device 120 may additionally, or alternatively, use the techniques described above to perform navigational path adjustment in real time as the drone device 120 travels along a selected navigational path. In such implementations, the drone device 120 after receiving an instruction to perform a particular action, the drone device 120 may initially select an initial path to travel to a destination point associated with the particular action. The drone device 120 may then monitor dynamic objects that are identified by a dynamic multi-dimensional spatial representation in real time as the drone device 120 travels along the selected path. In response to detecting a change in the present status of a particular object nearby the selected path, the drone device 120 may then determine if the change in status presents an obstruction to travel, and if it does, determine an alternative path section to arrive at the destination. For example, if a door that is initially open when the drone device 120 begins traveling on the initial path closes as the drone device 120 travels toward a destination, the drone device 120 may detect the change in the status of the door, and in response, repeat its travel along the initial navigational path with an alternative navigational path.

The process 200 can include performing the particular action according to the navigational path (250). For instance, once the drone device 120 selects a navigational path, the drone device 120 may travel along the navigational path to reach the destination point that is associated with the particular action to be performed by the drone device 120.

FIG. 3 illustrates an example of a technique for generating a dynamic multi-dimensional spatial representation of a property 301. The spatial representation can be used by the drone device 120 to detect changes to the placement, position, and/or configuration of an object within an indoor environment of the property 310, and determine the impact of the detected changes to the navigation abilities of the drone device 120.

In the example illustrated, the drone device 120 performs the technique in three steps. At step (1), an initial registration of the property 301 is performed. At step (2), a static multi-dimensional spatial map 304a of the property 301 is generated based on performing the initial registration. At step (3), a dynamic multi-dimensional spatial representation 304b of the property 301 is generated based on adjusting the static multi-dimensional spatial map 304a using dynamic object data 306.

Although descriptions below indicate that the illustrated technique is performed by the drone device 120, in some implementations, the illustrated technique can additionally or alternatively be performed by other components of the system 100. For example, the illustrated technique may be partially or fully performed by one or more of the monitor control unit 110, the application server 150, and/or another associated server that obtains monitoring data collected by the system 100. In such implementations, the static multi-dimensional spatial map 304a and the dynamic multi-dimensional spatial representation 304b may be generated by devices that are either local or remote from the drone device 120.

Referring initially to step (1), during an initial registration phase, the drone device 120 maps the indoor environment of the property 301. For instance, the drone device 120 may navigate through the indoor environment of the property 301 to identify boundaries such as walls, the ceiling, or openings. In some implementations, the drone device 120 may perform the initial registration phase using a two-dimensional floorplan associated with the property 301.

Referring now to step (2), the drone device 120 generates the static multi-dimensional spatial map 304a based on the data collected during the initial registration phase. For instance, the drone device 120 may identify contiguous surfaces that represent walls of the indoor environment and other fixed boundaries such as countertops or ceiling fixtures. The drone device 120 may use any suitable three-dimensional mapping technique (e.g., optical detection, infrared detection, etc.) to identify the size and arrangement of regions within the property 301.

In some implementations, the static multi-dimensional spatial map 304a may be stored and post-processed after being generated by the drone device 120 and/or generated based on data collected by the drone device 120. For instance, the static multi-dimensional spatial map 304a may be post-processed and/or enhanced to compensate for sensing deficiencies associated with the on-board sensors of the drone device 120. The multi-dimensional spatial map 304a may be enhanced by allowing an operator or system administrator to manually verify structural features and/or characteristics of the property 301 that have been identified by the drone device 120 while performing the initial registration in step (1).

As examples, structural features that are undetected by the drone device 120 (e.g., glass panels) or features that have been insufficiently captured by the drone device 120 (e.g., low texture surfaces) can be modified, replaced, or spliced into the static multi-dimensional spatial map 304a as enhancements. The enhanced spatial map can then be stored (e.g., at the application server 150) or transmitted to the drone device 120. In this regard, the enhanced spatial map can then be used by the drone device 120 to avoid any structural features such as glass panels that were not initially detected in the initial registration phase, but added during the post-processing stage.

Referring now to step (3), the drone device 120 generates the dynamic multi-dimensional spatial representation 304b based on obtaining and/or collecting dynamic object data 306. The dynamic multi-dimensional spatial representation 304b can either be generated based on adjusting the spatial map 304a (e.g., by inserting virtual graphical overlays onto locations of dynamic objects within the indoor environment of the property 301) or rendering a new spatial map with embedded dynamic object information.

The dynamic object data 306 may indicate a present status associated with dynamic objects that are located within an indoor environment of the property 301. For example, the dynamic object data 306 may identify doors and windows of the property 301 and corresponding locations of each door and window within an indoor environment of the property 301 (e.g., within the static multi-dimensional spatial map 304a).

In some implementations, on-board sensors of the drone device 120 can collect the dynamic object data 306. For example, the drone device 120 can include a calibrated stereo camera that is capable of estimating the size and location of detected objects during the initial registration stage in step (1). In another example, the drone device 120 can also include a three-dimensional volumetric mapping sensor that is capable of determining the distance between the drone device 120 and objects that are detected within its field of view. In such implementations, the drone device 120 may be capable of using automated object detection and recognition techniques to identify the presence of a dynamic object within its field of view as it performs the initial registration of the property 301. For example, the drone device 120 may be capable of utilizing machine learning techniques (e.g., using a recurrent neural network) to automatically identify known dynamic objects such as doors, windows, fixtures, furniture, among others.

Additionally, or alternatively, in some implementations, the dynamic object data 306 is obtained by the drone device 120 based on data collected by external sensors within the property 302 such as the sensors 132. For instance, data collected sensors that are physically placed on dynamic objects such as doors and windows can be obtained in order to enable the drone device 120 to infer a present status of the dynamic objects. For example, the drone device 120 to determine whether the window is fully closed, fully open, or partially open (and a degree to which the window is partially open) can use a measured height by a sensor that measures a height of a windowsill. In another example, continuous video footage of a back door that is captured by a security camera can be used to determine whether the back door is presently fully closed, fully open, or partially open. In some implementations, the drone device 120 may use a combination of on-board sensor data and/or external data (e.g., data collected by the sensors 132) to determine a present status associated with dynamic objects.

After obtaining the dynamic object data 306, the drone device 120 then generates the dynamic multi-dimensional spatial representation 304b. As described throughout, the dynamic multi-dimensional spatial representation 304b identifies the locations of detected dynamic objects within the static multi-dimensional spatial map, and includes a set of associated object information in table 308.

In the example illustrated, the dynamic multi-dimensional spatial representation 304b identifies dynamic objects A, B, C, D, and E corresponding respectively to a front door, an appliance, a den window, a bedroom window, and a bathroom door (closet and bedroom doors in this example are omitted for simplicity). The table 308 specifies a detected object type and an object status for each object that is identified in the dynamic multi-dimensional spatial representation. For example, the present status of object A is "CLOSED" because the front door of the property 302 is determined to be closed when the representation 304b is generated. In another example, the present status of the object C is "OPEN—40%" based the den window being detected to be approximately half-way open. In addition, the present status of the object E is "OPEN—74°" because the bathroom door is partially open and is detected to form a 74° angle relative to the doorframe on the left wall of the bathroom.

The illustrated example of the dynamic multi-dimensional spatial representation 304b in the figure represents one technique to map spatial information associated with dynamic objects with an indoor environment with associated status information of the dynamic objects. In other implementations, other types of rendering techniques can additionally or alternatively be used to enable the drone device 120 to more efficiently navigate through the property premises.

For instance, in some implementations, an area on a fixed surface of the property that corresponds to a dynamic object (e.g., a size of a door on a wall) can be represented with a virtual element such as a graphical overlay that is superimposed on a fixed spatial mapping such as the map 304a of the property 302. In such implementations, object status information can be used to selectively enable or disable the display of virtual elements to control navigation of the drone device 120. For example, if present status information indicates that a door is sufficiently open to permit passage of the drone device 120, then a virtual element corresponding to the door is inserted into the dynamic multi-dimensional spatial representation 304b to indicate to the drone device 120 that it may travel along navigational paths that require passage through the door. In this example, the virtual element may be removed from the representation 304b in real time if the door is detected to have closed to create an obstruction for the drone device 120. Alternatively, in other examples, a virtual element can be inserted into the spatial map if, for example, the present status indicates that a dynamic object presents an obstruction to the drone device 120 while traveling on a particular navigational path. In such examples, a door pathway may be represented in the static multi-dimensional spatial map as an opening corresponding to the size of the door. When a present status of the door indicates that it is closed, a virtual element may be superimposed on the opening in the multi-dimensional spatial map in order to prevent the drone device 120 from considering the door pathway a suitable navigational path.

FIG. 4 illustrates and example of a technique for computing a navigational path for performing a particular action.

In this example, a user 102 transmits a remote instruction to the drone device 120 perform a specified action (e.g., checking the bedroom window). As described above, the user 102 may transmit the instruction through a native application that runs on the user device 140. The received instruction is then transmitted to the application server 150 through a wide area network or a cellular connection and then relayed to the drone device 120 directly or through components of the system 100. In this regard, the illustrated techniques enable the user 102 to remotely instruct the drone device 120 to perform particular actions in relation to monitoring operations of the property 101.

Although descriptions below indicate that the illustrated technique is performed by the drone device 120, in some implementations, the illustrated technique can additionally or alternatively be performed by other components of the system 100. For example, the illustrated technique may be partially or fully performed by one or more of the monitor control unit 110, the application server 150, and/or another associated server that obtains monitoring data collected by the system 100. In such implementations, the drone device 120 and/or the sensors 132 may collect data indicating a present status of dynamic objects that are nearby an alternative navigational path, which then relay the collected data to the monitor control unit 110 and/or the application server 150. The monitor control unit 110 and/or the application server 150 may then aggregate the collected data to identify and/or select a navigational path for the drone device 120 to travel between its current location to the destination location associated with a particular action.

Once the drone device 120 receives the instruction, the drone device 120 may then identify a destination point associated with particular action specified by the instruction. In the illustrated example, the drone device 120 determines a location associated with the bedroom window within a property 401. This determination may be based on, for example, stored property information and/or floor plan information for the property 401.

The drone device 120 may then compute alternative navigational paths to travel to the identified destination point associated with the particular action specified by the instruction. In the example illustrated, the drone device 120 determines two alternative navigational paths, paths (1) and (2) to travel between the current location of the drone device 120 and the destination point (e.g., the bedroom window). The drone device 120 then determines path data 402 that identifies an estimated distance and travel time for each navigational path. For example, path (1) is determined to be the shorter path with a lower travel time compared to the length and travel time of the path (2), respectively.

The drone device 120 then uses the dynamic navigational techniques described above to obtain and/or collect dynamic object data 404 to improve the path calculation process. The dynamic object data 404 identifies dynamic objects that are detected within a proximity of the alternative navigational paths, and a present status associated with each detected dynamic object. In the example illustrated, the present status for object A is "CLOSED," whereas the present status for objects B-D are "OPEN."

In some implementations, the drone device 120 may additionally or alternatively use the dynamic object data 404 to perform path determination. For example, in some instances, the drone device 120 may initially identify a set of baseline navigational paths based only on the floorplan of the property 401. The drone device 120 may then use the information indicated by the dynamic object data 404 to identify the dynamic objects that are within a proximity to each of the baseline navigational paths. The drone device 120 may then use either the present status information and/or historical status information associated with each dynamic object to determine whether a particular navigational path is suitable for travel. For example, a navigational path may be suitable if each of the dynamic objects that it contains, or are nearby to, are determined to have a present status indicating that the drone device 120 may travel along the navigational path.

Additionally, or alternatively, in other instances, the drone device 120 may use the spatial and status information indicated by the dynamic object data 404 to determine all of the alternative navigational paths for a given starting point and destination point. For instance, the drone device 120 may determine the likelihood that two dynamic objects are likely to be included in the same navigational path based on their respective locations within the property 401. For example, objects B and C may be determined to be highly likely to be included in a single path because of their close proximity to one another and their arrangement around the same closet. In this regard, the drone device 120 may remove potential navigational paths that include two dynamic objects that are unlikely to be determined to considered a part of the single navigational path. For example, objects A and D may be determined to unlikely to be included in a single path because they are arranged on opposite ends of the property 101.

The drone device 120 then selects a navigational path from among the alternative navigational paths based on information indicated by the dynamic object data 404. In the example illustrated, the drone device 120 selects path (2) as the path even though it is longer than the path (1). This is because the present status for object a, which is a part of path (1), indicates that the bedroom door is closed and that the drone device 120 will be unable to pass through to reach the destination point. Alternatively, the present statuses for objects B, C, and D, which are parts of path (2), are indicated to be open, enabling the drone device 120 to successfully reach the destination point.

Although the example illustrated in FIG. 4 depicts use of dynamic navigational techniques to improve path calculation prior to traveling to a destination point, in some implementations, the drone device 120 can additionally use the illustrated techniques to improve real-time path adjustment as the drone device 120 travels along a selected navigational path. For example, in such implementations, the drone device 120 monitors the present status of dynamic objects in real-time to detect any changes that present obstructions to the travel of the drone device 120 along the selected navigational path. Once an obstruction is detected along the selected navigational path, the drone device 120 selects an alternative navigational path to the destination point in a manner similar to the techniques illustrated in FIG. 4. In this example, the drone device 120 may monitor the present status of both dynamic objects that are nearby the selected navigational path and/or other dynamic objects that are not nearby in order to determine an alternative navigational path.

In some implementations, in addition to selecting a navigational path from among a set of alternative navigational paths, the drone device 120 may use periodic surveillance data to adjust and/or recalculate navigational paths based on historical and/or present statuses of dynamic objects that are surveyed. For example, the drone device 120 may be configured to monitor a set of predefined path criteria (e.g., time of travel, length of navigational path, etc.) and compute a predicted impact of the historical and/or present statuses of the dynamic objects that are surveyed on the predefined path criteria for a set of alternative navigational paths. In this regard, the drone device 120 may use these techniques to remove certain navigational paths that do not satisfy the predefined path criteria from selection of a navigational path to travel in order to complete a specified action.

In some implementations, when multiple alternative navigational paths are available for travel between the present location of the drone device 120 and the destination point associated with a particular action, the drone device 120 may initially proceed to travel along the shortest navigational path. In such implementations, the drone device 120 may only perform the dynamic navigation techniques illustrated in FIGS. 3 and 4 upon detecting an obstruction along the shortest navigational path in order to conserve battery and reduce power consumption associated with performing the dynamic navigation techniques.

The drone device 120 may also use other types of battery conservation techniques. For example, the drone device 120 may use historical statuses previously determined for dynamic objects to predict a present status without actually verifying the present status. For example, if the historical status information for a bedroom door indicates that it is closed at 3 AM, then the drone device 120 may predict that the present status for the bedroom door is likely to be closed even though the bedroom door is not actually within the field of view of the drone device 120. In this regard, the prediction technique reduces the need for the drone device 120 to travel to the location of each dynamic object to verify its present status.

FIG. 5 illustrates an example of a process 500 for determining a navigation path within a property based on a spatial representation of the property and a present status of a dynamic object within the property. Briefly, the process 500 can include the operations of receiving an instruction to perform an action at a particular location of a property (510), obtaining a spatial representation of the property that identifies a dynamic object (520), obtaining sensor data collected by one or more sensors of a monitoring system of the property (530), determining a path to the particular location (540), and navigating the path to the particular location (550).

In general, the operations of the process 500 are described below in reference to the system 100, although any property management system can be configured to perform such operations. For example, a property management system that includes an autonomous device to perform monitoring operations can be used to perform the operations of the process 500. In this example, a path that is determined based on a present status of a dynamic object can be navigated by the autonomous device. In some implementations, the operations are performed by a single component of the system 100, such as drone device 120. In other implementations, the operations are performed by multiple components of the system 100. The descriptions below reference the drone device 120 performing the operations of the process 500 for simplicity and clarity.

In more detail, the process 500 can include the operations of receiving an instruction to perform an action at a particular location of a property (510). For example, the drone device 120 can receive an instruction to perform an action at a particular location of the property 101. As discussed above, the instruction can be transmitted directly from the user device 140 over the network 105 if the user 102 is presently occupying the property 101, or alternatively, relayed through the application server 150 if the user 102 is remote from the property 101. The instruction can involve performing a monitoring operation, e.g., checking the status of a door or window, performing a routine maintenance operation, performing a device control operation, e.g., toggling power controls of the appliances 134, among other types of actions.

The process 500 can include the operation of obtaining a spatial representation of the property that identifies a dynamic object (520). For example, the drone device 120 can obtain a spatial representation of the property 101 that identifies a dynamic object. As discussed above, the spatial representation can include a status of the dynamic object that represents an impact on an ability of the drone device 120 to navigate near the dynamic object. For example, as shown in FIG. 3, the table 308 specifies dynamic objects A-E that are identified in the dynamic multi-dimensional spatial representation 306*b*. The table 308 also specifies a status for each dynamic object that is identified in the dynamic multi-dimensional spatial representation 306*b*.

As discussed above, the status for a dynamic object represents a placement, configuration, location, or structure of the dynamic object at a particular time point. For example, a status of a window can represent whether the window is open or closed, or the degree to which the window is open. In another example, the status of a door can represent whether the door is open or closed, or the degree to which the door is open represented by the angle formed between the edge of the door and the door frame. In yet another example, the status of an appliance such as a ceiling fan can represent if the fan is on or off.

The process 500 can include the operation of obtaining sensor data collected by one or more sensors of a monitoring system of the property (530). For example, the drone device 120 can obtain sensor data collected by the sensors 132 of the system 100 of the property 101. The drone device 120 can obtain sensor data based on identification of the dynamic object within the spatial representation of the property 101.

In the example depicted in FIG. 3, the drone device 120 uses the table 308 to identify the dynamic objects that are identified in the multi-dimensional spatial representation 306*b*, and then obtain sensor data corresponding to the dynamic objects. For instance, the drone device 120 obtains sensor data collected by sensors that are associated with the dynamic objects A-E. As an example, the drone device 120 obtains data collected by a door sensor placed on a door corresponding to the dynamic object A. In this example, the sensor data can be used to determine whether the door is open or closed even if the door is not within the line of sight of the drone device 120.

To identify sensor data corresponding to dynamic objects within the spatial representation of the property 101, the drone device 120 generates associations between the dynamic objects and sensors that collect sensor data corresponding to the dynamic objects. For example, during initial registration of the property 101 as discussed above in reference to FIG. 3, the drone device 120 can generate the multi-dimensional spatial representation 304*a* of the property 101 and then use dynamic object data 306 to identify dynamic objects within the multi-dimensional spatial representation 304*a*. The drone device 120 can then obtain data managed by the system 100 that identifies each of the sensors 132, including sensors that are associated with the dynamic objects. In the example depicted in FIG. 3, the sensors 132 includes door sensors placed on dynamic objects A and E, window sensors placed on dynamic objects C and D, and an appliance that represents the dynamic object B. In this regard, the drone device 120 can use the associations to correlate sensor data collected by a particular sensor to status for a dynamic object that is associated to the particular sensor. For example, sensor data indicating that a door has recently been closed can be used to update a status for a dynamic object corresponding to the door within a spatial representation of the property 101. As another example, the drone device 120 can determine that sensed data of a door sensor (e.g., door opened, door closed) matches visual data collected for an uncorrelated door and that no other uncorrelated sensor is providing that data. In response, the drone device 120 can determine that the visualized door and the door sensor that collects the sensed data correlate so that the sensed data collected by the door sensor can be used to determine a present status for a dynamic object corresponding to the door.

This technique can be used by the drone device 120 to monitor and/or update statuses of dynamic objects that are not within the line of sight of the drone device 120. The process 500 can include the operation of determining a path to the particular location (540). For example, the drone device 120 determines a path to the particular location based on the spatial representation of the property 101 and the present status of the dynamic object. In the example depicted in FIG. 4, the drone device 120 determines a path to a bedroom window of the property 401 that is associated with the instruction received from the user device 140. In this example, the path is determined based on a selection from among two candidate paths identified in the path data 402. To select the path, the drone device 120 identifies present statuses of dynamic objects within the dynamic object data 404 that are associated with the two candidate paths.

The path determined by the drone device 120 is also determined based on a present location of the drone device 120 within the property 101 when the instruction is received by the drone device 120. For example, the present location of the drone device 120 can be used to identify candidate navigational paths based on boundaries specified within the spatial representation and determine dynamic objects that are associated with each of the candidate paths, e.g., dynamic objects that fall within or are nearby a particular candidate path.

As shown in FIG. 4, drone device 120 selects candidate path (2) as the path to the bedroom window because the present status of the dynamic object A (which is associated with candidate path (1)) is "CLOSED" and the present statuses of the dynamic objects B and C (which are associated with the candidate path (2)) is "OPEN." In this example, the drone device 120 selects the candidate path (2) because the drone device 120 determines, based on the present statuses of the dynamic objects identified in the spatial representation of the property 401, that the candidate path (1) is not capable of being navigated to arrive at the bedroom window.

In some implementations, the drone device 120 generates a new spatial representation of the property each time it determines a change to a present status of the dynamic object, e.g., a door that was previously identified as being open is now determined to be closed. In such implementations, the drone device 120 generates a second (or new) spatial representation of the property 101 that identifies the present status of the dynamic object such that the present status reflects a change to the status of the dynamic object as identified in a prior spatial representation of the property 101. For example, if a door has recently been opened, the second spatial representation can reflect an opening that coincides with the opened door as opposed to a wall representing an obstruction to the ability of the drone device 120 to navigate through the closed door. In such implementations, the path to the particular location is determined based on the updated status of the dynamic object identified in second spatial representation of the property as discussed above.

In some implementations, the drone device 120 generates a new spatial representation and/or determines the present status of the dynamic object each time after it receives an instruction but prior to navigating to the particular location referenced in the instruction. For example, in response to receiving an instruction, the drone device 120 can obtain the most recent spatial representation that represents the most recent status of the dynamic object prior to receiving the instruction. In this example, the drone device 120 obtains sensor data to determine if a present status of the dynamic object matches the most recent status (e.g., no change in status of the dynamic object) or if the present status reflects a change to the most recent status. If the present status reflects a change, the drone device 120 can generate a new spatial representation to represent the present status and for use in a later operation, or alternatively, use the present status to identify a path to navigate to the particular location without generating a new spatial representation.

As discussed above, and depicted in FIG. 4, in some implementations, the drone device 120 determines the path to the particular location by selecting a candidate path from among multiple candidate paths to the particular location. For example, the drone device 120 can identify multiple candidate paths for navigating to the particular location of the property, e.g., candidate paths (1) and (2) as depicted in FIG. 4. In this example, each candidate path is associated with different dynamic objects, e.g., candidate path (1) is associated with dynamic object A and candidate path (2) is associated with dynamic objects B, C, and D. In other examples, the multiple candidate paths can share one or more dynamic objects. As discussed above, the selection of a candidate path from multiple the multiple candidate paths can be based on the present status of dynamic objects associated with each of the multiple candidate paths, as discussed above in reference to FIG. 4.

In some implementations, the selection of a candidate path is based on determining that a particular candidate path is not suitable for navigation. In the example depicted in FIG. 4, the drone device 120 identifies a first candidate path (1) that is associated with dynamic object A and a second candidate path (2) that is associated with dynamic objects B, C, and D. In this example, present status of the dynamic object A indicates that its closed, whereas the present statuses of dynamic objects C and D indicate that they are open, and based on these statuses, the drone device 120 determines that the dynamic object A prevents the ability of the drone device 120 to navigate the candidate path (1). Additionally, the present statuses of the dynamic objects (C) and (D) allows the drone device 120 to navigate the candidate path (2), which causes the drone device 120 to select the drone device 120 as the path to navigate to the particular location.

The process 500 can include the operation of navigating the path to the particular location (550). For example, the drone device 120 navigates the path determined in step 540 to the particular location. In the example depicted in FIG. 4, the drone device 120 navigates the candidate path (2) to the bedroom window of the property 401. As discussed above, the candidate path (2) is selected by the drone device 120 based on present statuses of the dynamic objects identified in the dynamic object data 404.

As an example of the process 500 discussed above, in some instances, the dynamic object is a door of the property 101. In such instances, the status of the dynamic object can indicate whether the door is opened or closed. For example, a previous status of the dynamic object can indicate that the door is closed and the present status can indicate that the door has been opened after receiving the instruction to perform the action at the particular location. In this example, the present status can be used by the drone device 120 to determine that the door is no longer an obstruction to navigation and can therefore navigate a path through the door to the particular location.

In some implementations, the spatial representation of the property 101 is generated during an initial registration operation when the drone device 120 characterizes the interior environment of the property 101. As discussed above, the drone device 120 generates the spatial representation based on collected spatial data of the physical environment, e.g., three-dimensional depth data with the use of scanning lasers. In the example depicted in FIG. 3, the spatial data is processed by the drone device 120 to generate the spatial representation 304a of the property 310.

In some implementations, the operations of the process 500 can be performed by different components of the system 100. For example, the monitor control unit 110 perform steps 510, 520, 530, and 540 by collecting and processing sensor data collected by the sensors 132, and the drone device 120 can perform step 550 by navigating the property 101 based on the identification of dynamic objects and their corresponding statuses within a physical environment of the property. In such implementations, the application server 150 can collect and store data associated with dynamic objects and their corresponding statuses.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
   receiving, by a drone device, an instruction to perform an action at a particular location of a property;
   obtaining, by the drone device, a spatial representation of the property that identifies a dynamic object, where a status of the dynamic object indicates an ability of the drone device to navigate near the dynamic object;
   obtaining, by the drone device and based at least on identification of the dynamic object in the spatial representation of the property, sensor data collected by one or more sensors of a monitoring system of the property that indicates a present status of the dynamic object;
   identifying, by the drone device and based on the sensor data, a set of candidate paths for navigating to the particular location;
   determining, by the drone device, that (i) the dynamic object is included in a first candidate path within the set of candidate paths and (ii) the present status of the dynamic object indicates that the dynamic object prevents the ability of the drone device to navigate along the first candidate path;
   selecting, by the drone device and based on determining that the present status of the dynamic object indicates that the dynamic object restricts the ability of the drone device to navigate along the first candidate path, a second candidate path, from among the set of candidate paths, the second candidate path being different from the first candidate path; and
   navigating, by the drone device, the second candidate path to the particular location.

2. The method of claim 1, further comprising:
   determining, based on the sensor data, a change to the status of the dynamic object identified within the spatial representation of the property;
   generating a second spatial representation of the property that identifies the present status of the dynamic object, the present status reflecting the change to the status of the dynamic object identified within the spatial representation of the property; and
   wherein the second candidate path is selected based on the second spatial representation of the property.

3. The method of claim 2, wherein the spatial representation of the property is generated prior to receiving the instruction to perform the action at the particular location of the property.

4. The method of claim 1, wherein:
   the dynamic object is a door of the property;
   the status of the dynamic object identified in the spatial representation for the property indicates that the door is open;
   the present status of the dynamic object indicates that the door has been closed after receiving the instruction to perform the action at the particular location of the property; and
   selecting the second candidate path comprises selecting a candidate path, from among the set of candidate paths, that does not include the door.

5. The method of claim 1, further comprising:
collecting, by the drone device, spatial data of a physical environment of the property during an initial registration of the property; and
generating the spatial representation based on the spatial data of the physical environment of the property collected during the initial registration of the property.

6. The method of claim 1, wherein the spatial representation of the property is generated in response to receiving a prior instruction to perform an action at the particular location.

7. The method of claim 1, further comprising:
determining, by the drone device, a present location of the drone device within the property based on the spatial representation; and
wherein the second candidate path is selected based on the present location of the drone device within the property.

8. The method of claim 1, wherein obtaining the sensor data collected by one or more sensors of the monitoring system of the property comprises:
obtaining, from the monitoring system, association data that identifies sensors of the monitoring system as corresponding to physical objects located within the property; and
determining that the one or more sensors from among the sensors of the monitoring system corresponds to a physical object that is represented by the dynamic object within the spatial representation of the property.

9. A system comprising:
one or more computers; and
one or more storage devices storing instructions that, when executed by the one or more computers, cause the one or more computers to perform operations comprising:
receiving, by a drone device, an instruction to perform an action at a particular location of a property;
obtaining, by the drone device, a spatial representation of the property that identifies a dynamic object, where a status of the dynamic object indicates an ability of the drone device to navigate near the dynamic object;
obtaining, by the drone device and based at least on identification of the dynamic object in the spatial representation of the property, sensor data collected by one or more sensors of a monitoring system of the property that indicates a present status of the dynamic object;
identifying, by the drone device and based on the sensor data, a set of candidate paths for navigating to the particular location;
determining, by the drone device, that (i) the dynamic object is included in a first candidate path within the set of candidate paths and (ii) the present status of the dynamic object indicates that the dynamic object restricts the ability of the drone device to navigate along the first candidate path;
selecting, by the drone device and based on determining that the present status of the dynamic object indicates that the dynamic object restricts the ability of the drone device to navigate along the first candidate path, a second candidate path, from among the set of candidate paths, the second candidate path being different from the first candidate path; and
navigating, by the drone device, the second candidate path to the particular location.

10. The system of claim 9, wherein the operations further comprise:
determining, based on the sensor data, a change to the status of the dynamic object identified within the spatial representation of the property;
generating a second spatial representation of the property that identifies the present status of the dynamic object, the present status reflecting the change to the status of the dynamic object identified within the spatial representation of the property; and
wherein the second candidate path is selected based on the second spatial representation of the property.

11. The system of claim 10, wherein the spatial representation of the property is generated prior to receiving the instruction to perform the action at the particular location of the property.

12. The system of claim 9, wherein:
the dynamic object is a door of the property;
the status of the dynamic object identified in the spatial representation for the property indicates that the door is open;
the present status of the dynamic object indicates that the door has been closed after receiving the instruction to perform the action at the particular location of the property; and
selecting the second candidate path comprises selecting a candidate path, from among the set of candidate paths, that does not include the door.

13. A non-transitory computer-readable storage device encoded with computer program instructions that, when executed by one or more computers, cause the one or more computers to perform operations comprising:
receiving, by a drone device, an instruction to perform an action at a particular location of a property;
obtaining, by the drone device, a spatial representation of the property that identifies a dynamic object, where a status of the dynamic object indicates an ability of the drone device to navigate near the dynamic object;
obtaining, by the drone device and based at least on identification of the dynamic object in the spatial representation of the property, sensor data collected by one or more sensors of a monitoring system of the property that indicates a present status of the dynamic object;
identifying, by the drone device and based on the sensor data, a set of candidate paths for navigating to the particular location;
determining, by the drone device, that (i) the dynamic object is included in a first candidate path within the set of candidate paths and (ii) the present status of the dynamic object indicates that the dynamic object prevents the ability of the drone device to navigate along the first candidate path;
selecting, by the drone device and based on determining that the present status of the dynamic object indicates that the dynamic object restricts the ability of the drone device to navigate along the first candidate path, a second candidate path, from among the set of candidate paths, the second candidate path being different from the first candidate path; and
navigating, by the drone device, the second candidate path to the particular location.

14. The device of claim 13, wherein the operations further comprise:
determining, based on the sensor data, a change to the status of the dynamic object identified within the spatial representation of the property;
generating a second spatial representation of the property that identifies the present status of the dynamic object, the present status reflecting the change to the status of the dynamic object identified within the spatial representation of the property; and wherein the second candidate path is selected based on the second spatial representation of the property.

15. The device of claim 13, wherein the spatial representation of the property is generated prior to receiving the instruction to perform the action at the particular location of the property.

16. The device of claim 13, wherein:

the dynamic object is a door of the property;

the status of the dynamic object identified in the spatial representation for the property indicates that the door is open;

the present status of the dynamic object indicates that the door has been closed after receiving the instruction to perform the action at the particular location of the property; and selecting the second candidate path comprises selecting a candidate path, from among the set of candidate paths, that does not include the door.

\* \* \* \* \*